United States Patent
Lee et al.

(10) Patent No.: US 12,505,628 B2
(45) Date of Patent: Dec. 23, 2025

(54) ELECTRONIC DEVICE AND METHOD FOR RENDERING BASED ON TRACKING INFORMATION FOR USER'S MOVEMENT

(71) Applicant: Samsung Electronics Co., Ltd., Suwon-si (KR)

(72) Inventors: Jinsuk Lee, Suwon-si (KR); Junsik Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 18/451,498

(22) Filed: Aug. 17, 2023

(65) Prior Publication Data

US 2024/0177431 A1  May 30, 2024

Related U.S. Application Data

(63) Continuation of application No. PCT/KR2023/011467, filed on Aug. 4, 2023.

(30) Foreign Application Priority Data

Nov. 28, 2022 (KR) .................. 10-2022-0161361
Jan. 4, 2023 (KR) .................. 10-2023-0001453

(51) Int. Cl.
  *G06T 19/00* (2011.01)
  *G02B 27/01* (2006.01)
  (Continued)

(52) U.S. Cl.
  CPC .......... *G06T 19/006* (2013.01); *G02B 27/017* (2013.01); *G06F 3/012* (2013.01);
  (Continued)

(58) Field of Classification Search
  CPC ....... G06T 19/006; G06T 7/70; G02B 27/017; G02B 2027/0178; G06F 3/012; G06V 40/11
  See application file for complete search history.

(56) References Cited

U.S. PATENT DOCUMENTS 10,102,666 B2   10/2018   Parker et al.
10,732,411 B2   8/2020    Jin
(Continued)

FOREIGN PATENT DOCUMENTS

KR   10-2018-0016973 A   2/2018
KR   10-2018-0066702 A   6/2018
(Continued)

OTHER PUBLICATIONS

International Search Report and Written Opinion dated Nov. 22, 2023 in International Application No. PCT/KR2023/011467.

*Primary Examiner* — Ryan R Yang
(74) *Attorney, Agent, or Firm* — Jefferson IP Law, LLP

(57) ABSTRACT

An electronic device is provided. The electronic device may comprise at least one processor, a tracking sensor, a communication circuit, and a display. The at least one processor may obtain first tracking information for a movement of a user through the tracking sensor. The at least one processor may receive, from an external electronic device through the communication circuit, image property information to request a rendering. The at least one processor may identify a tracking property of a first image based on the image property information. The at least one processor may determine a rendering start timing for the first image having the tracking property based on a rendering processing time. The at least one processor may transmit, to the external electronic device through the communication circuit, a message including the image property information of the first image and the first tracking information, based on the rendering (Continued)

start timing for the first image. The at least one processor may receive, from the external electronic device through the communication circuit, a first rendering image rendered based on the image property information of the first image and the first tracking information. The at least one processor may display, through the display, a second rendering image generated based on the first rendering image. The image property information of the first image may comprise information on whether an object included in the first image is rendered based on tracking information.

20 Claims, 9 Drawing Sheets

(51) Int. Cl.
*G06F 3/01* (2006.01)
*G06T 7/70* (2017.01)
*G06V 40/10* (2022.01)

(52) U.S. Cl.
CPC ............... *G06T 7/70* (2017.01); *G06V 40/11* (2022.01); *G02B 2027/0178* (2013.01)

(56) References Cited

U.S. PATENT DOCUMENTS

| | | | |
|---|---|---|---|
| 10,802,287 | B2 | 10/2020 | Selan |
| 10,853,991 | B1 | 12/2020 | Yan et al. |
| 10,958,890 | B2 | 3/2021 | Bouazizi et al. |
| 10,964,033 | B2 | 3/2021 | Habibian et al. |
| 11,170,579 | B2 | 11/2021 | Frommhold et al. |
| 11,443,718 | B2 | 9/2022 | Manfred et al. |
| 12,039,743 | B2 | 7/2024 | Todd et al. |
| 2018/0101965 | A1* | 4/2018 | Park .................... H04W 4/02 |
| 2019/0243444 | A1* | 8/2019 | Wen .................... G06T 19/00 |
| 2021/0368152 | A1 | 11/2021 | Nishibe et al. |
| 2022/0122616 | A1 | 4/2022 | Kobayashi et al. |
| 2023/0222990 | A1 | 7/2023 | Yun et al. |
| 2023/0316583 | A1 | 10/2023 | Yip et al. |

FOREIGN PATENT DOCUMENTS

| | | |
|---|---|---|
| KR | 10-2018-0067220 A | 6/2018 |
| KR | 10-2021-0113602 A | 9/2021 |
| WO | 2020/153092 A1 | 7/2020 |
| WO | 2022/015020 A1 | 1/2022 |

\* cited by examiner

ELECTRONIC DEVICE AND METHOD FOR RENDERING BASED ON TRACKING INFORMATION FOR USER'S MOVEMENT

CROSS-REFERENCE TO RELATED APPLICATION(S)

This application is a continuation application, claiming priority under § 365(c), of an International application No. PCT/KR2023/011467, filed on Aug. 4, 2023, which is based on and claims the benefit of a Korean patent application number 10-2022-0161361, filed on Nov. 28, 2022, in the Korean Intellectual Property Office, and of a Korean patent application number 10-2023-0001453, filed on Jan. 4, 2023, in the Korean Intellectual Property Office, the disclosure of each of which is incorporated by reference herein in its entirety.

TECHNICAL FIELD

The disclosure relates to an electronic device and method for rendering based on tracking information for a user's movement.

BACKGROUND ART

For interaction between reality and a virtual world in virtual reality (VR), augmented reality (AR), and/or mixed reality (MR), the user's movement may be tracked. The tracked user's movement may be input to a processor and may be reflected in the graphic. User movement tracking may be performed through a controller or a sensor of a head-mounted display (HMD).

The above information is presented as background information only to assist with an understanding the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device and method for rendering based on tracking information for a user's movement.

In accordance with an aspect of the disclosure, an electronic device is provided. The electronic device includes at least one processor, a tracking sensor, a communication circuit, and a display. The at least one processor may obtain first tracking information for a movement of a user through the tracking sensor. The at least one processor may receive, from an external electronic device through the communication circuit, image property information to request a rendering. The at least one processor may identify a tracking property of a first image based on the image property information. The at least one processor may determine a rendering start timing for the first image having the tracking property based on a rendering processing time. The at least one processor may transmit, to the external electronic device through the communication circuit, a message including the image property information of the first image and the first tracking information, based on the rendering start timing for the first image. The at least one processor may receive, from the external electronic device through the communication circuit, a first rendering image rendered based on the image property information of the first image and the first tracking information. The at least one processor may display, through the display, a second rendering image generated based on the first rendering image. The image property information of the first image may comprise information on whether an object included in the first image is rendered based on tracking information.

In accordance with an aspect of the disclosure, a method performed by an electronic device is provided. The method includes obtaining first tracking information for a movement of a user through a tracking sensor. The method may comprise receiving, from an external electronic device through a communication circuit, image property information to request a rendering. The method may comprise identifying a tracking property of a first image based on the image property information. The method may comprise determining a rendering start timing for the first image having the tracking property based on a rendering processing time. The method may comprise transmitting, to the external electronic device through the communication circuit, a message including the image property information of the first image and the first tracking information, based on the rendering start timing for the first image. The method may comprise receiving, from the external electronic device through the communication circuit, a first rendering image rendered based on the image property information of the first image and the first tracking information. The method may comprise displaying, through a display, a second rendering image generated based on the first rendering image. The image property information of the first image includes information on whether an object included in the first image is rendered based on tracking information.

In accordance with an aspect of the disclosure, an electronic device is provided. The electronic device includes at least one processor and a communication circuit. The at least one processor may identify image property information of a first image rendered based on tracking information as a tracking property. The at least one processor may identify image property information of a second image rendered independently of the tracking information as a non-tracking property. The at least one processor may transmit the image property information to an external electronic device through the communication circuit. The at least one processor may receive, through the communication circuit, the image property information of the first image and the first tracking information, based on a rendering start timing. The at least one processor may generate a first rendering image by rendering based on the received image property information of the first image and the first tracking information. The at least one processor may transmit, the rendered first rendering image to an external electronic device through the communication circuit.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
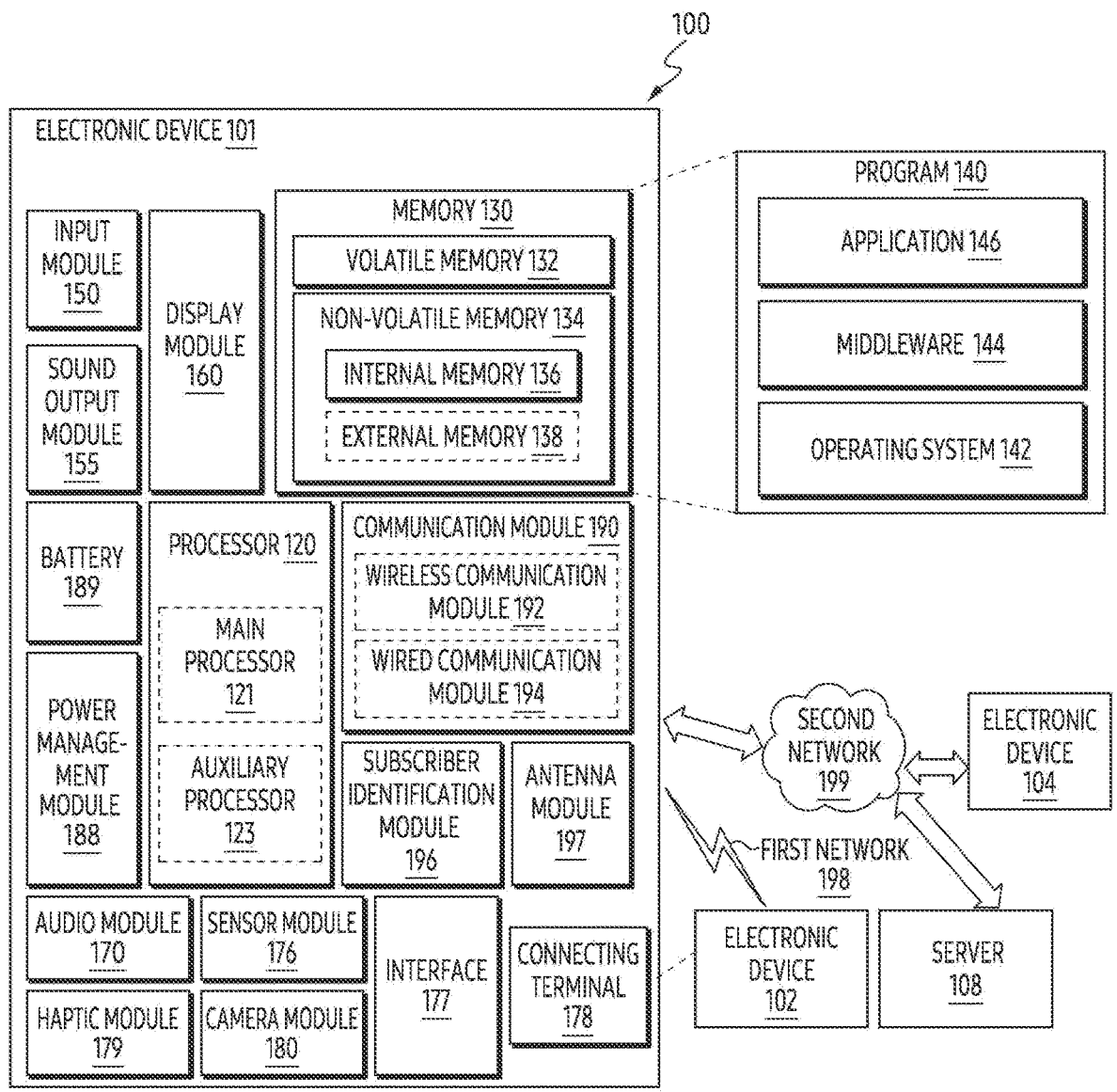
FIG. 1 is a block diagram of an electronic device in a network environment according to one or more embodiments.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein, including technical or scientific terms, may have the same meaning as commonly understood by those having ordinary knowledge in the art which the disclosure describes. Among the terms used in the disclosure, terms defined in a general dictionary may be interpreted as having the same or similar meaning as those in the context of the related art, and are not interpreted in an ideal or excessively formal meaning unless clearly defined in the disclosure. In some cases, even terms defined in the disclosure cannot be interpreted to exclude embodiments of the disclosure.

In various embodiments of the disclosure described below, a hardware access method will be described as an example. However, since various embodiments of the disclosure include art using both hardware and software, various embodiments of the disclosure do not exclude a software-based access method.

Terms that refer to a combination (e.g., combination, merging, and montaging), terms that refer to a virtual image (e.g., image of virtual reality and image of augmented reality), terms that refer to a remote display device (e.g., remote display device and head-mounted display (HMD) device), terms that refer to a specified value (e.g., reference value and threshold value), and the like used in the following description are illustrated for convenience of description. Accordingly, the disclosure is not limited to terms to be described below, and other terms having an equivalent technical meaning may be used. In addition, a term such as '... part', '... er', '... material', '... body', and the like used below may mean at least one shape structure, or may mean a unit that processes a function.

In addition, in the disclosure, an expression of greater than or less than may be used to determine whether a specific condition is satisfied or fulfilled, but this is only a description for expressing an example and does not exclude more or less description. Conditions described as "greater than or equal" may be replaced with "greater than," conditions described as "less than or equal" may be replaced with "less than," and conditions described as "greater than or equal and less than" may be replaced with "greater than and less than or equal." In addition, hereinafter, 'A' to 'B' denotes at least one of the elements from A (including A) to B (including B).

Prior to describing embodiments of the disclosure, terms necessary for describing operations of an electronic device according to the embodiments are defined.

A remote display device may be an electronic device for displaying images such as virtual reality, augmented reality, and mixed reality. A remote rendering device may be an electronic device that receives an image generated by rendering to the remote display device.

Hereinafter, various embodiments disclosed in the disclosure will be described with reference to the accompanying drawings. For convenience of description, the sizes of the components illustrated in the drawings may be exaggerated or reduced, and the disclosure is not necessarily limited by the drawings.

FIG. 1 is a block diagram illustrating an electronic device in a network environment according to one or more embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197.

In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic device 102, electronic device (104) or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
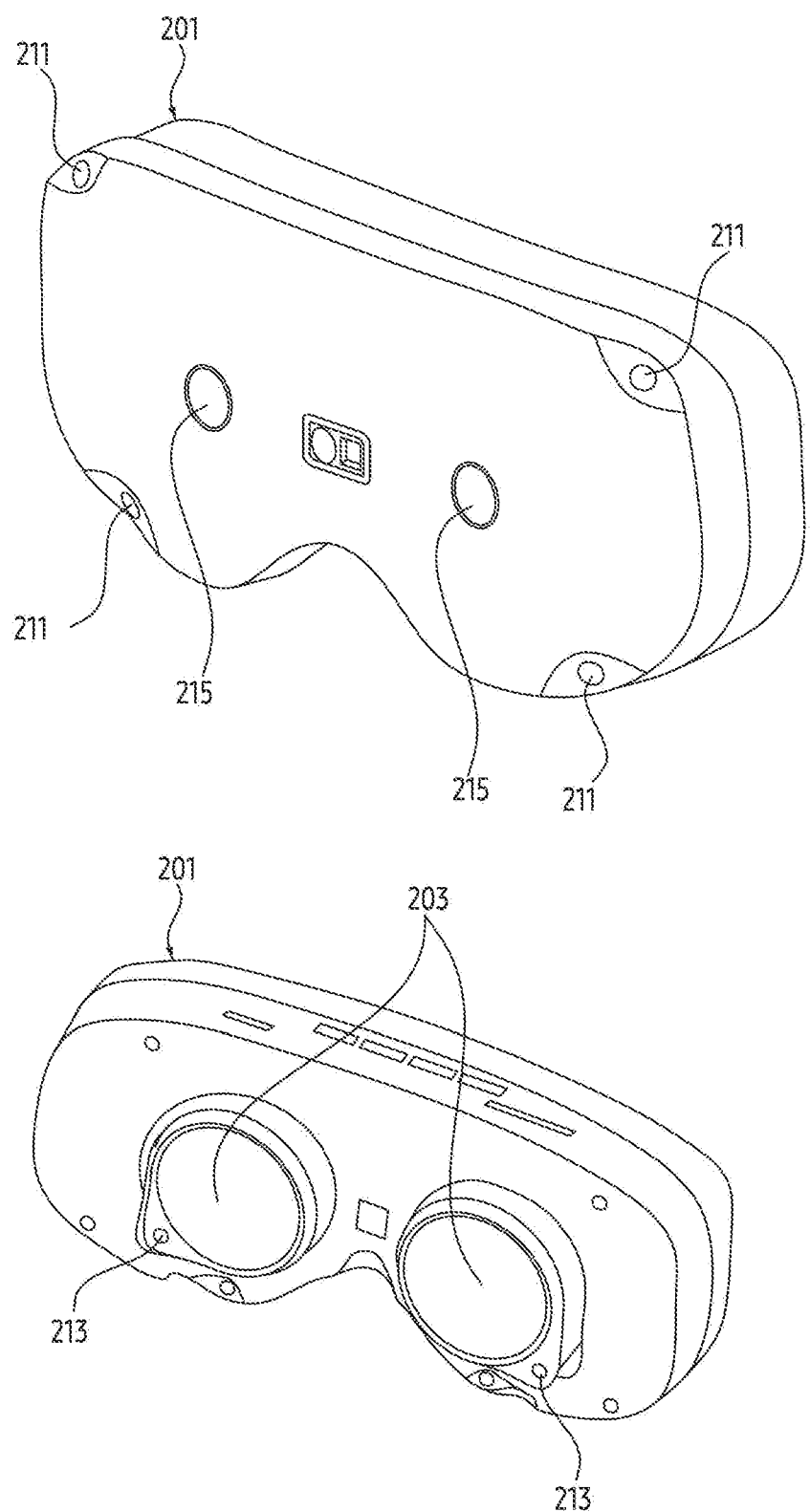
FIG. 2 illustrates an example of a remote display device according to one or more embodiments.

FIG. 2 illustrates an example of a remote display device according to one or more embodiments.

Referring to FIG. 2, a remote display device 201 may have a shape that adheres to user's eyes in case that a user wears. A display 203 may display a virtual image. A first camera unit 211, a second camera unit 213, and a third camera unit 215 may be included in the remote display device 201. The display 203 and the second camera unit 213 may be disposed on a first surface of the remote display device 201. The first camera unit 211 and the third camera unit 215 may be disposed on a second surface of the remote display device 201. The first surface may be disposed to face toward a user's face when the remote display device 201 is worn by a user. The second surface may be opposite to the first surface. The second surface may be a surface spaced apart from the first surface.

In an embodiment, the display 203 may include, for example, a liquid crystal display (LCD), a digital mirror device (DMD), a liquid crystal on silicon (LCos), an organic light emitting diode (OLED), or a micro light emitting diode (micro LED). Although not illustrated, in case that the display 203 is made of one of a liquid crystal display, a digital mirror device, or a liquid crystal on silicon, the remote display device 201 may include a light source that radiates light to a screen output area of the display 203. In an embodiment, in case that the display 203 may generate light on its own, for example, in case that it is made of either an organic light emitting diode or a micro light emitting diode, the remote display device 201 may provide a virtual image of good quality to a user even if it does not include a separate light source. In an embodiment, when the display 203 is implemented as an organic light emitting diode or a micro light emitting diode, a light source is unnecessary, and thus the remote display device 201 may be lightweight. The remote display device 201 may include the display 203. A user may use the remote display device 201 while wearing it on the face. According to various embodiments, in case that the display 203 is transparent, it may configure a screen display unit by being disposed at a position facing user's eyes. A lens may serve to adjust the focus of a screen output to the display 203. For example, the lens may be a fresnel lens. The lens may be a pancake lens. The lens may be a multi-channel lens.

In an embodiment, the first camera unit 211 may include a recognition camera. The recognition camera may be used for 3 degrees of freedom (3DOF), head tracking of 6 degrees of freedom (6DOF), hand detection and tracking, controller tracking, and spatial recognition. The recognition camera may be a global shutter (GS) camera. Two or more GS cameras may be used as stereo cameras are required for head tracking and spatial recognition. The GS camera may detect fast action and fine movement. The GS camera may reduce motion blur. The first camera unit 211 may perform spatial recognition for 6DOF and simultaneous localization and mapping (SLAM) function through depth photographing. In addition, the first camera unit 211 may perform a user gesture recognition function. According to an embodiment, the at least one processor may track light emitted from a light source of a controller through the first camera unit 211. The at least one processor may track a movement of a controller through the first camera unit 211.

In an embodiment, the second camera unit 213 may include a camera for eye tracking (ET). An eye tracking (ET) camera may detect and track the pupil. The eye tracking (ET) camera may be used to position the center of a virtual video reflected on augmented reality (AR) glasses according to a direction in which the pupil of a wearer of the augmented reality (AR) glasses are gazing. The second camera unit 213 may include a global shutter (GS) camera to detect the pupil and track a rapid pupil movement. The global shutter (GS) camera may detect fast action and fine movement. The global shutter (GS) camera may reduce motion blur. Eye tracking (ET) cameras may be installed for the left and right eyes, respectively. The performance and specifications of the left-eye camera and the right-eye camera may be the same.

In an embodiment, a third camera unit 215 may include a photographing camera. The third camera unit 215 is called a high resolution (HR) or a photo video (PV), and a high-resolution camera may be used. The third camera unit 215 may use a camera equipped with functions for obtaining high-definition video such as autofocus (AF) function and optical image stabilization (OIS). The third camera unit 215 may be a GS camera. The third camera unit 215 may be a rolling shutter (RS) camera. A light detection and ranging (Lidar) sensor may be disposed at a position where the third camera unit 215 is disposed instead of a camera.

In an embodiment, a remote display device 201 may include a microphone, a speaker, a battery, an antenna, and/or a sensor. The sensor may include an acceleration sensor, a gyro sensor, and/or a touch sensor.

Figure 3:
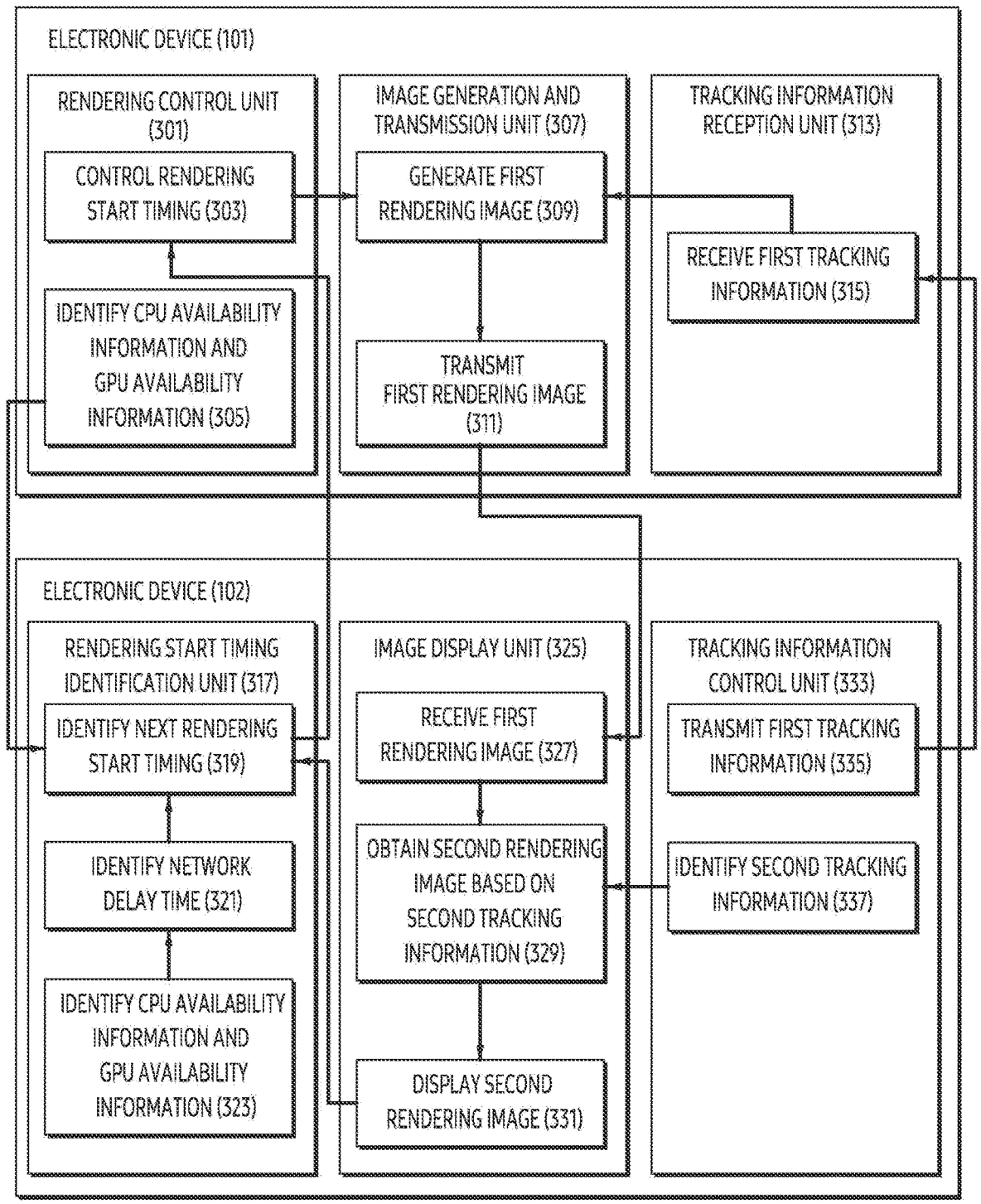
FIG. 3 illustrates a functional configuration of a remote rendering device and a remote display device according to one or more embodiments.

FIG. 3 illustrates a functional configuration of a remote rendering device and a remote display device according to one or more embodiments.

Referring to FIG. 3, an electronic device 101 may include a rendering control unit 301, an image generation and transmission unit 307, and a tracking information reception unit 313. The rendering control unit 301 may perform operation 303. The rendering control unit 301 may perform operation 305. The image generation and transmission unit 307 may perform operation 309. The image generation and transmission unit 307 may perform operation 311. The tracking information reception unit 313 may perform operation 315. An electronic device 102 may include a rendering start timing identification unit 317, an image display unit 325 and a tracking information control unit 333. The rendering start timing identification unit 317 may perform operation 319. The rendering start timing identification unit 317 may perform operation 321. The rendering start timing identification unit 317 may perform operation 323. The image display unit 325 may perform operation 327. The image display unit 325 may perform operation 329. The image display unit 325 may perform operation 331. The tracking information control unit 333 may perform operation 335. The tracking information control unit 333 may perform operation 337.

According to an embodiment, the electronic device 101 may be a remote rendering device. For example, the electronic device 101 may be a computer. For another example, the electronic device 101 may be a smartphone. According to an embodiment, the electronic device 102 may be a remote display device. For example, the electronic device 102 may be a head-mounted display (HMD). The electronic device 102 may be augmented reality (AR) glasses.

According to an embodiment, in operation 303, the rendering control unit 301 may control a rendering start timing. The rendering control unit 301 may perform a rendering based on receiving a message for requesting a rendering from the electronic device 102. The message for requesting a rendering may include image property information and tracking information. The image property information may include information on whether an object included in an image is rendered based on tracking information or not. The image property information may include information on whether an object included in an image is rendered independently of tracking information or not. The image property information may include a priority between objects in an image. According to an embodiment, in operation 305, the rendering control unit 301 may identify central processing unit (CPU) availability information of the electronic device 101 and graphic processing unit (GPU) availability information of the electronic device 101. The rendering control unit 301 may transmit the identified availability information to the electronic device 102.

According to an embodiment, in operation 309, the image generation and transmission unit 307 may generate a first rendering image. The image generation and transmission unit 307 may perform a rendering based on a first tracking information received from the electronic device 102 and data for a rendering. Data for the rendering may be received from an application. For example, data for the rendering may be received from an application for virtual reality (VR). For another example, data for the rendering may be received from an application for augmented reality (AR). The image generation and transmission unit 307 may identify a rendering processing time. The rendering processing time may be a time taken for the rendering. The image generation and transmission unit 307 may transmit the time taken for the rendering to the electronic device 102. According to an embodiment, in operation 311, the image generation and transmission unit 307 may transmit a first rendering image. The image generation and transmission unit 307 may transmit the first rendering image generated in operation 309 to the electronic device 102 for display.

According to an embodiment, in operation 315, the tracking information reception unit 313 may receive first tracking information. The first tracking information may be information measured before the electronic device 102 transmits a message for requesting a rendering to the electronic device 101. The message for requesting the rendering may include image property information and the first tracking information. The first tracking information may be obtained by tracking a user's movement. Regarding a first image having the tracking property, the image generation and transmission unit 307 may generate a first rendering image based on tracking information received by the tracking information reception unit 313.

According to an embodiment, the electronic device 102 may be a remote display device. For example, the electronic device 102 may be a head-mounted display (HMD). The electronic device 102 may be augmented reality (AR) glasses.

According to an embodiment, in operation 323, the rendering start timing identification unit 317 may receive central processing unit (CPU) availability information of the electronic device 101 and graphic processing unit (GPU) availability information of the electronic device 101 from the electronic device 101. This is because the greater the CPU availability of the electronic device 101 and/or the GPU availability of the electronic device 101, the shorter a time taken for a rendering. The rendering start timing identification unit 317 may identify central processing unit (CPU) availability information of the electronic device 102 and graphic processing unit (GPU) availability information of the electronic device 102. This is because the greater the CPU availability of the electronic device 102 and/or the GPU availability of the electronic device 102, the shorter a time taken for image processing. The rendering start timing identification unit 317 may receive a rendering processing time from the electronic device 101. The rendering processing time may correspond to a time taken for a rendering. A rendering start timing may be indicated as a time interval after an image display timing. For example, a rendering start timing may be approximately 1 ms after an image display timing. For example, the rendering start timing may be approximately 3 ms after an image display timing. The rendering start timing may be adjusted. The image display timing may be a timing when the display displays a screen. An interval between the image display timing may be a time interval at which the display displays a screen. For example, when the display displays a screen at about 60 hertz (Hz), a time interval between the image display timing may be about $\frac{1}{60}$ seconds. For another example, when the display displays a screen at about 120 hertz (Hz), a time interval between the image display timing may be about $\frac{1}{120}$ seconds.

According to an embodiment, in operation 321, the rendering start timing identification unit 317 may identify a network delay time. The network delay time may be a time required for wireless communication between the electronic device 101 and the electronic device 102. For example, the network delay time may be a time taken for the electronic device 101 to transmit a signal to the electronic device 102. For another example, the network delay time may be a time taken for the electronic device 102 to transmit a signal to the electronic device 101.

According to an embodiment, in operation 319, the rendering start timing identification unit 317 may identify a next rendering start timing. The rendering start timing may be identified based on the rendering processing time which is a time taken for a rendering, the network delay time, central processing unit (CPU) availability information of the electronic device 102, graphic processing unit (GPU) availability information of the electronic device 102, central processing unit (CPU) availability information of the electronic device 101, graphic processing unit (GPU) availability information of the electronic device 101, and a display timing of the second rendering image.

According to an embodiment, in operation 327, the image display unit 325 may receive a first rendering image.

According to an embodiment, in operation 329, the image display unit 325 may obtain a second rendering image based on second tracking information. The image display unit 325 may obtain a second rendering image by correcting the first rendering image based on second tracking information on a user's movement. The second tracking information may be identified by tracking a user's movement after receiving a first rendering image.

According to an embodiment, in operation 331, the image display unit 325 may display a second rendering image. The image display unit 325 may display the second rendering image through a display. The image display unit 325 may identify a time interval between an acquisition timing of the first rendering image and a display timing of the second rendering image. The image display unit 325 may transmit the identified time interval between the acquisition timing of the first rendering image and the display timing of the second rendering image to the rendering start timing identification unit 317. According to an embodiment, when the time interval is greater than or equal to a first reference value, the rendering start timing identification unit 317 may delay a rendering start timing after a rendering display timing compared to a rendering start timing after a rendering display timing of a previous period. In other words, when the time interval in the first period is greater than or equal to a first reference value, the rendering start timing identification unit 317 may set an interval between a display timing of a second rendering image in the first period and a rendering start timing in the second period to be longer than an interval between a display timing of a second rendering image in a previous period of the first period and a rendering start timing in the first period. According to an embodiment, when the time interval is less than a second reference value, the rendering start timing identification unit 317 may set a rendering start timing after a rendering display timing to be earlier than a rendering start timing after a rendering display timing in a previous period. The second reference value may be less than the first reference value. In other words, when the time interval in the first period is less than a second reference value, the rendering start timing identification unit 317 may set an interval between a display timing of a second rendering image in the first period and a rendering start timing in the second period to be shorter than an interval between a display timing of a second rendering image in a previous period of the first period and a rendering start timing in the first period. Adjusting a rendering start timing even when the time interval is less than a second reference value is to allow a rendering image to reach a display timing of a second rendering image even though a rendering processing time is longer than expected.

According to an embodiment, in operation 335, the tracking information control unit 333 may transmit first tracking information to the electronic device 101 through a communication circuit. The electronic device 102 may obtain first tracking information on a user's movement through a tracking sensor. For example, the tracking sensor may be a camera (e.g., the first camera unit 211 of FIG. 2) for head tracking. For example, the tracking sensor may be a camera (the second camera unit 213 of FIG. 2) for gaze tracking (or eye tracking). For example, the tracking sensor may be an inertial sensor for tracking a user's head angle. The electronic device 102 may perform wireless communication with an external electronic device through the communication circuit. The tracking information control unit 333 may transmit first tracking information identified before a rendering start timing to the electronic device 101 through a communication circuit. To allow the electronic device 101 to use first tracking information when rendering, the tracking information control unit 333 may transmit the first tracking information to the electronic device 101 through a communication circuit.

According to an embodiment, in operation 337, the tracking information control unit 333 may identify second tracking information. The tracking information control unit 333 may identify second tracking information after the image display unit 325 receives a first rendering image. The tracking information control unit 333 may transmit the second tracking information to the image display unit 325.

Figure 4:
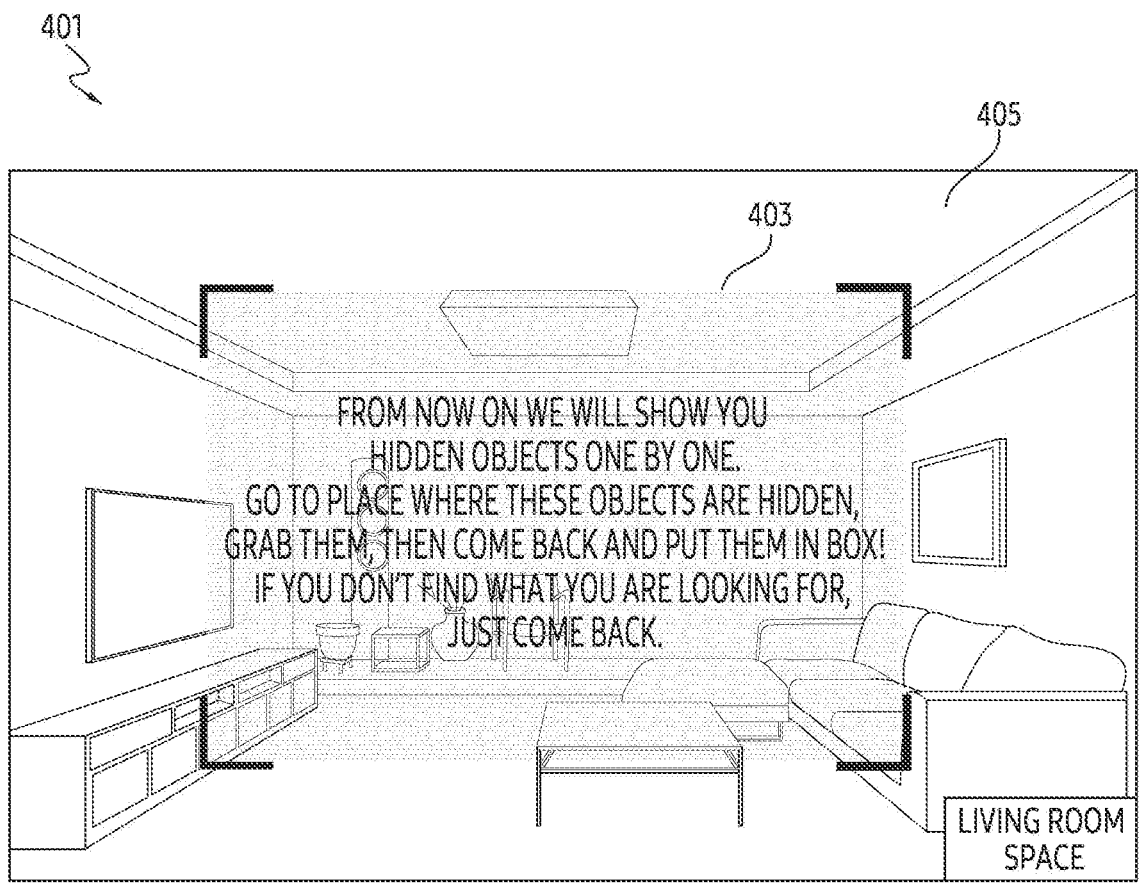
FIG. 4 illustrates an example of a tracking image generated based on image property information according to one or more embodiments.

FIG. 4 illustrates an example of a tracking image generated based on image property information according to one or more embodiments.

Referring to FIG. 4, a rendering image 401 may be displayed through a display of a remote display device (e.g., an electronic device 102 of FIG. 1). A non-tracking object 403 is a part of the rendering image 401 and may be rendered without using tracking information. A tracking object 405 is a part of the rendering image 401 and may be rendered by using tracking information.

According to an embodiment, the non-tracking object 403 may be displayed at a specific position on a screen independently of a user's head angle or a user's hand motion. A remote rendering device (e.g., the electronic device 101 of FIG. 1) may render the non-tracking object 403 without using tracking information on a user's movement. According to an embodiment, the non-tracking object 403 may be a guide window for explaining the setting of a game. The remote display device (e.g., electronic device 102) may display the guide window at a center of a screen independently of a user's gaze. According to an embodiment, the non-tracking object 403 may be a scoreboard for displaying a score of a game. The remote display device (e.g., electronic device 102) may display the scoreboard on a lower end of a screen independently of a user's gaze.

According to an embodiment, the tracking object 405 is another part of the rendering image 401 and may be rendered by using first tracking information. The tracking object 405 may indicate a living room space, which is a screen of a game. According to an embodiment, the tracking object 405 may be changed according to the user's head angle. For example, when a user turns the head to the left, the tracking object 405 may indicate the living room space on the left. For another example, when a user raises the head upward, the tracking object 405 may indicate an upper part of the living room. According to an embodiment, the tracking object 405 may be changed according to a direction in which the user's pupil moves. For example, when a user moves the pupil to the left, the tracking object 405 may indicate the living room space on the left. For example, when a user moves the pupil upward, the tracking object 405 may indicate an upper part of the living room. For example, when a user moves the pupil to the left, the tracking object 405 may render by increasing the resolution of the living room space on the left. For example, when a user moves the pupil upward, the upper living room space may be rendered with a higher resolution.

According to an embodiment, the non-tracking object 403 may be rendered first compared to the tracking object 405. This is because the tracking object 405 requires tracking information when rendering. When the non-tracking object 403 is rendered first, system resources are distributed, and thus a rendering time of the tracking object 405 may be reduced. In addition, when the non-tracking object 403 is rendered first, an identification timing of first tracking information necessary for rendering the tracking object 405 may be delayed. Therefore, the tracking object 405 may be generated based on first tracking information measured at a timing closer to a rendering image display timing compared to a case where the non-tracking object 403 and the tracking object 405 are simultaneously drawn. In other words, the tracking object 405 may be generated based on tracking information measured at a timing closer to a rendering image display timing compared to a case where the non-tracking object 403 and the tracking object 405 are simultaneously drawn. As a time interval between a first tracking timing and a rendering display timing becomes smaller, the difference between a direction of a user's gaze and a direction of a rendering image becomes smaller, so the user can feel less dizzy due to a mismatch between a user's motion and a user's field of view.

Figure 5:
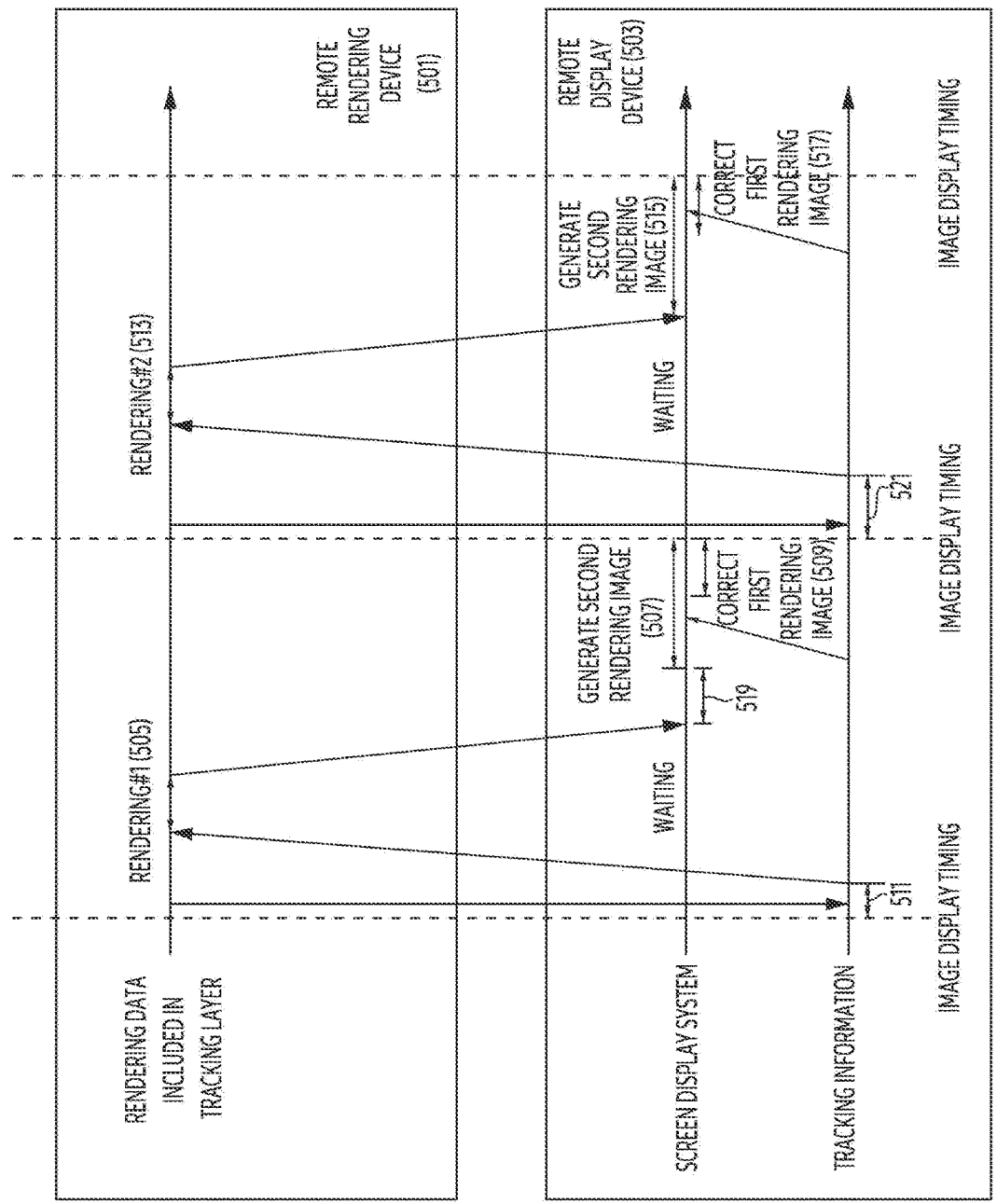
FIG. 5 illustrates an example of communication between a remote rendering device and a remote display device for displaying a rendering image according to one or more embodiments.

FIG. 5 illustrates an example of communication between a remote rendering device and a remote display device for displaying a rendering image according to one or more embodiments.

Referring to FIG. 5, a remote display device 503 may identify a rendering start timing based on receiving image property information from a remote rendering device 501. At the rendering start timing, the remote display device 503 may transmit a message for requesting a rendering to the remote rendering device 501. The remote rendering device 501 may render an image based on a message for requesting a rendering of the remote display device 503. The message for requesting a rendering may include image property information and tracking information. In a first period, the remote rendering device 501 may perform operation 505. The remote display device 503 may perform operations 507 and 509. In a second period, the remote rendering device 501 may perform operation 513. The remote display device 503 may perform operations 515 and 517. A time interval 511 may be a time between a display timing of a second rendering image in a previous period of the first period and the first rendering start timing. A time interval 519 may be a time between an acquisition timing of the first rendering image and a generation start timing of the second rendering image. A time interval 521 may be a time between an image display timing of the second rendering image in the first period and the rendering start timing in the second period. The image display timing may be a timing when the display displays a screen. The interval between the image display timings may be a time interval at which the display displays a screen. For example, when the display displays a screen at about 60 hertz (Hz), the time interval between the image display timings may be about 1/60 seconds. For another example, when the display displays a screen at about 120 hertz (Hz), the time interval between the image display timings may be about 1/120 seconds. A rendering start timing may be indicated as a time interval after the image display timing. For example, a rendering start timing may be approximately 1 ms after the image display timing. For example, the rendering start timing may be approximately 3 ms after the image display timing.

In the first period, the remote display device 503 may identify a rendering start timing. At the rendering start timing, the remote display device 503 may transmit a message including image property information for requesting a rendering and first tracking information on a user's movement to the remote rendering device 501 through a communication circuit (e.g., the communication module 190 of FIG. 1). The image property information may include information on whether an object included in an image is rendered based on tracking information or not. The image property information may include information on whether an object included in an image is rendered independently of tracking information or not. The image property information may include a priority between objects in an image.

According to an embodiment, the remote display device 503 may identify the central processing unit (CPU) availability information of the remote display device 503 and the graphic processing unit (GPU) availability information of the remote display device 503. The remote display device 503 may receive the central processing unit (CPU) availability information of the remote rendering device 501 and the graphic processing unit (GPU) availability information of the remote rendering device 501. According to an embodiment, the rendering start timing may be identified based on the central processing unit (CPU) availability information of the remote rendering device 501, the graphic processing unit (GPU) availability information of the remote rendering device 501, the central processing unit (CPU) availability information of the remote display device 503, the graphic processing unit (GPU) availability information of the remote display device 503, a rendering processing time, and a network delay time. The rendering processing time may determine an acquisition timing of the first rendering image. The remote rendering device 501 may determine an acquisition timing of the first rendering image so that an interval between the acquisition timing of the first rendering image and a generation start timing of the second rendering image is less than a reference value.

In operation 505 in the first period, the remote rendering device 501 may generate a first rendering image through a rendering based on receiving the message received from the remote display device 503. According to an embodiment, the first rendering image may be generated by synthesizing a first part and a second part. The first part may be generated based on tracking information. The second part may be generated without using tracking information. The remote rendering device 501 may transmit the rendered first rendering image to the remote display device 503.

In operation 507 in the first period, the remote display device 503 may receive the rendered first rendering image. The remote display device 503 may identify second tracking information on a user's movement. The second tracking information may be identified after a timing of receiving the first rendering image. The remote display device 503 may obtain a second rendering image by correcting the first rendering image based on the second tracking information. This is to reduce an error of the second rendering image by reducing a time interval between the tracking information identification timing and the generation start timing of the second rendering image. The remote display device 503 may display the second rendering image through a display included in the remote display device 503.

In operation 509 in the first period, the remote display device 503 may correct the first rendering image based on the second tracking information. Operation 509 may be included in operation 507. According to an embodiment, the remote display device 503 may obtain a second rendering image indicating a space further to the left than the first rendering image as it is identified that a user turned the head more to the left at a timing of identifying the second tracking information compared to a timing of identifying the first tracking information. According to an embodiment, the remote display device 503 may identify the time interval 519. The time interval 519 may be a time between an acquisition timing of the first rendering image in the first period and a generation start timing of the second rendering image in the first period. The remote display device 503 may set the time interval 521 to be longer than the time interval

511 when the time interval 519 in the first period is greater than or equal to a reference value. The time interval 521 may be a time between a display timing of the second rendering image in the first period and the rendering start timing in the second period. The time interval 511 may be a time between a display timing of the second rendering image in a previous period of the first period and the rendering start timing in the first period. The time interval 521 may be increased compared to the time interval 511 to reduce the time between the acquisition timing of the first rendering image in the second period and the generation start timing of the second rendering image in the second period. When the time between the acquisition timing of the first rendering image in the second period and the generation start timing of the second rendering image in the second period is reduced, the time between the acquisition timing of the first rendering image in the second period and the display timing of the second rendering image in the second period may be reduced. When the time between the acquisition timing of the first rendering image in the second period and the display timing of the second rendering image in the second period is reduced, an error of the second rendering image may be reduced by reducing the time interval between the tracking information identification timing (first tracking information identification timing or second tracking information identification timing) and the display timing of the second rendering image. When the error of the second rendering image is reduced, a user may feel less dizziness caused by a mismatch between a motion and a field of view compared to a case where the error of the second rendering image is large.

In the second period, the remote display device 503 may identify a rendering start timing based on receiving image property information from the remote rendering device 501. At the rendering start timing, the remote display device 503 may transmit a message including image property information for requesting a rendering and first tracking information on a user's movement to the remote rendering device 501 through the communication module 190.

According to an embodiment, the rendering start timing may be identified based on the central processing unit (CPU) availability information of the remote rendering device 501, the graphic processing unit (GPU) availability information of the remote rendering device 501, the central processing unit (CPU) availability information of the remote display device 503, the graphic processing unit (GPU) availability information of the remote display device 503, a rendering processing time, and a network delay time. The network delay time between the remote rendering device 501 and the remote display device 503 in the second period may be identified based on the network delay time in the first period, an amount of data to be rendered in the first period, and an amount of data to be rendered in the second period. For example, the network delay time in the second period may be a value obtained by dividing the network delay time in the first period and the amount of data to be rendered in the second period by the amount of data to be rendered in the first period.

In operation 513 in the second period, the remote rendering device 501 may generate a first rendering image through rendering based on receiving the message received from the remote display device 503. The remote rendering device 501 may transmit the rendered first rendering image to the remote display device 503.

In operation 515 in the second period, the remote display device 503 may receive the rendered first rendering image. The remote display device 503 may identify second tracking information on a user's movement. The second tracking information may be identified after a timing of receiving the first rendering image. The remote display device 503 may obtain a second rendering image by correcting the first rendering image based on the second tracking information. This is to reduce an error of the second rendering image by reducing the time interval between the tracking information identification timing and the display timing of the second rendering image.

In operation 517 in the second period, the remote display device 503 may correct the first rendering image based on the second tracking information. Operation 517 may be included in operation 515. This is to reduce the time between the acquisition timing of the first rendering image in the second period and the display timing of the second rendering image in the second period. When the time between the acquisition timing of the first rendering image in the second period and the display timing of the second rendering image in the second period is reduced, an error of the second rendering image may be reduced by reducing the time interval between the tracking information identification timing (the first tracking information identification timing or the second tracking information identification timing) and the display timing of the second rendering image. When the error of the second rendering image is reduced, a user may feel less dizziness caused by a mismatch between a motion and a field of view compared to a case where the error of the second rendering image is large.

Figure 6:
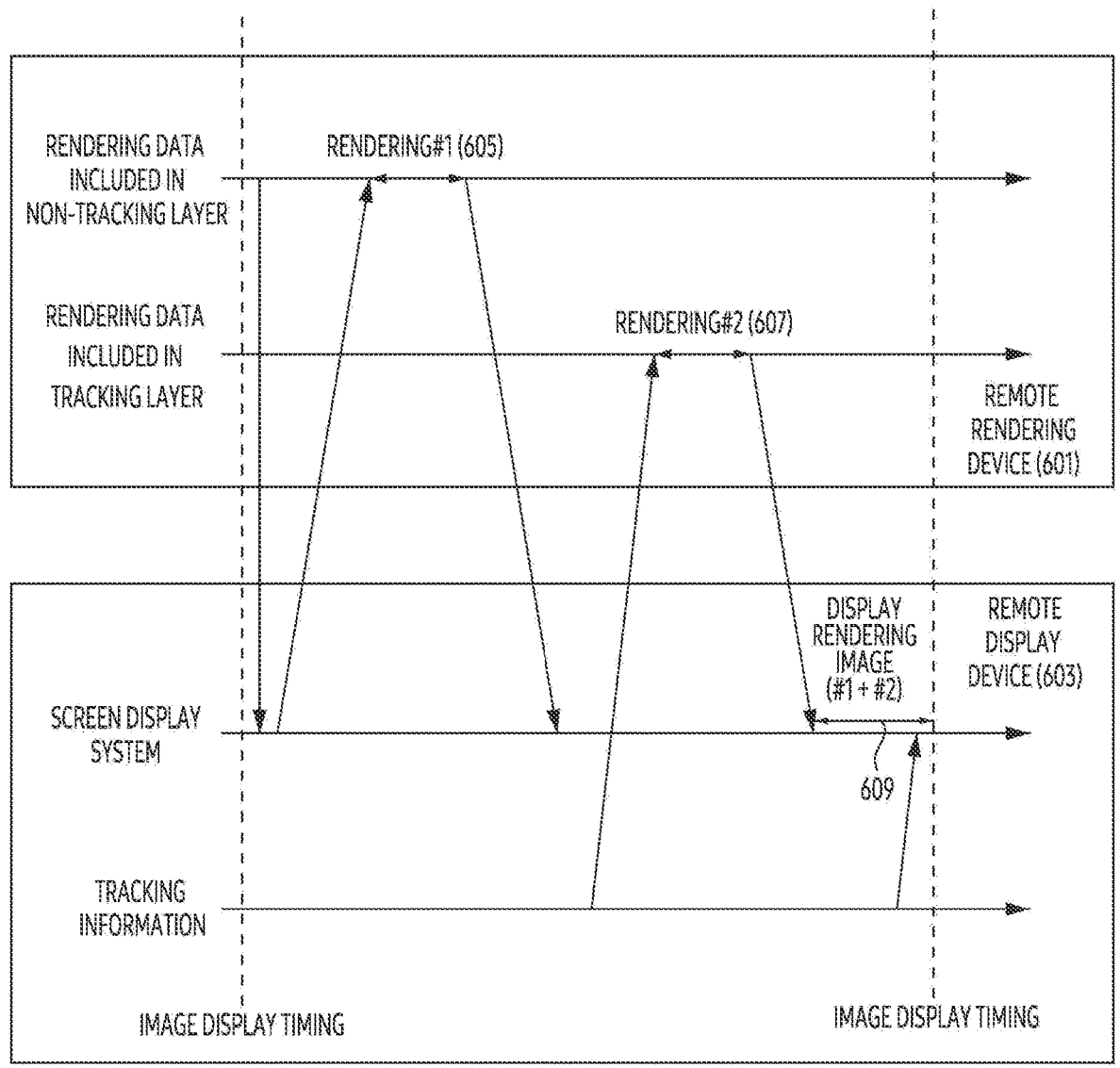
FIG. 6 illustrates an example of communication between a remote rendering device and a remote display device for displaying a rendering image according to image property information according to one or more embodiments.

FIG. 6 illustrates an example of communication between a remote rendering device and a remote display device for displaying a rendering image according to image property information according to one or more embodiments.

Referring to FIG. 6, a remote display device 603 may identify a rendering start timing based on receiving data on a plurality of layers from a remote rendering device 601. The rendering start timing may be different according to image property information for requesting a rendering. At the rendering start timing, the remote display device 603 may transmit a message for requesting a rendering of a second image having a non-tracking property to the remote rendering device 601. The second image having the non-tracking property may be referred to as a non-tracking layer. The remote rendering device 601 may render an image based on a message for requesting a rendering of a second image having a non-tracking property of the remote display device 603. The message for requesting a rendering may include image property information. The image property information may include information on whether an object included in an image is rendered based on tracking information or not. The image property information may include information on whether an object included in an image is rendered independently of tracking information or not. The remote rendering device 601 may perform operations 605 and 607. The remote display device 603 may perform operation 609. An interval between image display timing may be an interval at which a display displays a screen. For example, when the display displays the screen at about 60 hertz (Hz), the time interval between the image display timing may be about 1/60 seconds. For another example, when the display displays the screen at about 120 hertz (Hz), the time interval between the image display timing may be about 1/120 seconds.

According to an embodiment, the rendering start timing may be indicated as a time interval after the image display timing. For example, the rendering start timing may be approximately 1 ms after the image display timing. For example, the rendering start timing may be approximately 3 ms after the image display timing. The rendering start timing may be adjusted according to image property information.

For example, a rendering start timing of a first image using tracking information for rendering may be later than a rendering start timing of a second image not using tracking information for rendering. For example, a rendering start timing of the first image to indicate a virtual reality (VR) environment may be later than a rendering start timing of the second image for indicating a system window. This is to make the time for identifying tracking information as close as possible to the display timing of the second rendering image by delaying the rendering of the first image. When a time interval between the timing of identifying the tracking information and the timing of displaying the second rendering image decreases, an error of the second rendering image may be reduced compared to a case where the time interval is large. When the error of the second rendering image is reduced, a user may feel less dizziness caused by a mismatch between the motion and the field of view compared to a case where the error of the second rendering image is large.

According to an embodiment, the rendering start timing may be identified based on a priority corresponding to an image. According to an embodiment, in the first image having a tracking property, the higher the priority, the slower the rendering start time. For example, the remote rendering device 601 may identify a first rendering start timing based on a first object in the first image having the tracking property. The remote rendering device 601 may identify a second rendering start timing based on a second object in the second image having the tracking property. A first priority corresponding to the first object may be higher than a second priority corresponding to the second object. The second rendering start timing may be earlier than the first rendering start timing. In the first image having a tracking property, as the object included in the first image has a higher priority, the first image may be rendered based on tracking information identified later compared to a case in which the priority of the object included in the first image is low. This is because an error of a rendering image reduces as it is rendered based on the late identified tracking information. The priority may be determined according to an object. For example, the closer an object is to a user on a virtual image, the higher the priority may be. This is because an object closer to a user on the virtual image is more affected by tracking information than an object farther from a user on the virtual image. According to an embodiment, in a non-tracking layer, the rendering start timing may be earlier as the priority is higher. For example, the remote display device 603 may identify a third rendering start timing based on a third object having the non-tracking property. The remote rendering device 601 may identify a fourth rendering start timing based on a fourth object having the non-tracking property. A third priority corresponding to the third object may be higher than a fourth priority corresponding to the fourth object. The third rendering start timing may be earlier than the fourth rendering start timing. Data included in a second image having a non-tracking property may have an earlier rendering start timing when a priority of an object in the second image is higher compared to a case in which a priority of the object is low. This is because the second image is rendered without using tracking information. Since the rendering image may be stably secured more when the rendering start timing is earlier, the rendering start timing may be earlier when the priority is higher. The priority may be determined according to an object.

At the rendering start timing for the second image having a non-tracking property, the remote display device 603 may transmit a message for requesting a rendering to the remote rendering device 601. The remote rendering device 601 may render an image based on the message for requesting a rendering of the remote display device 603. The message for requesting a rendering may include image property information of the second image having a non-tracking property. For example, at the rendering start timing, the remote display device 603 may transmit a message for requesting a rendering of the second image having a non-tracking property to the remote rendering device 601.

According to an embodiment, the rendering start timing may be identified based on the central processing unit (CPU) availability information of the remote rendering device 601, the graphic processing unit (GPU) availability information of the remote rendering device 601, the central processing unit (CPU) availability information of the remote display device 603, the graphic processing unit (GPU) availability information of the remote display device 603, a rendering processing time, and a network delay time. According to an embodiment, the remote display device 603 may identify the central processing unit (CPU) availability information of the remote display device 603 and the graphic processing unit (GPU) availability information of the remote display device 603. The remote display device 603 may receive the central processing unit (CPU) availability information of the remote rendering device 601 and the graphic processing unit (GPU) availability information of the remote rendering device 601. The rendering processing time may determine an acquisition timing of the first rendering image. The remote rendering device 601 may determine the acquisition timing of the first rendering image such that an interval between the acquisition timing of the first rendering image and the display timing of the second rendering image is less than a reference value.

In operation 605, the remote rendering device 601 may generate a part of a first rendering image through rendering based on receiving the message received from the remote display device 603. The remote rendering device 601 may transmit the part of the first rendering image to the remote display device 603.

At the rendering start timing for a tracking layer, the remote display device 603 may transmit a message for requesting a rendering to the remote rendering device 601. The remote rendering device 601 may render an image for the first image having a tracking property based on the message for requesting a rendering of the remote display device 603. The message for requesting a rendering may include the image property information and first tracking information on a user's movement. For example, at the rendering start timing, the remote display device 603 may transmit a message including tracking image property information and the first tracking information to the remote rendering device 601 through a communication circuit (e.g., the communication module 190 of FIG. 1).

According to an embodiment, the rendering start timing may be identified based on the central processing unit (CPU) availability information of the remote rendering device 601, the graphic processing unit (GPU) availability information of the remote rendering device 601, the central processing unit (CPU) availability information of the remote display device 603, the graphic processing unit (GPU) availability information of the remote display device 603, a rendering processing time, and a network delay time.

In operation 607, the remote rendering device 601 may generate another part of the first rendering image through rendering based on receiving the message received from the remote display device 603. The remote rendering device 601 may transmit the other part of the first rendering image to the remote display device 603.

In operation 609, the remote display device 603 may synthesize the part of the first rendering image generated based on a second image having a non-tracking property and the other part of the first rendering image generated based on a first image having a tracking property. The remote display device 603 may generate a first rendering image by synthesizing the part of the first rendering image and the other part of the first rendering image. The remote display device 603 may generate a first rendering image by synthesizing a part of the first rendering image generated based on the second image having a non-tracking property and another part of the first rendering image generated based on the first image having a tracking property. When the second image having the non-tracking property is first rendered, the rendering time of data included in the first image having a tracking property may be reduced by distributing system resources. In addition, when data included in the second image having the non-tracking property is first rendered, an identification timing of the first tracking information necessary for rendering the first image having a tracking property may be delayed. Therefore, the first image may be generated based on the first tracking information measured at a timing closer to the rendering image display timing compared to a case of simultaneously rendering the second image having a non-tracking property and the first image having a tracking property. The remote display device 603 may reduce an error of the rendering image by reducing a time interval between a tracking information identification timing and a display timing of the second rendering image.

After receiving parts of the first rendering image from the remote rendering device, the remote display device 603 may identify second tracking information on a user's movement again. The remote display device 603 may obtain a second rendering image by correcting the first rendering image based on the second tracking information.

Figure 7:
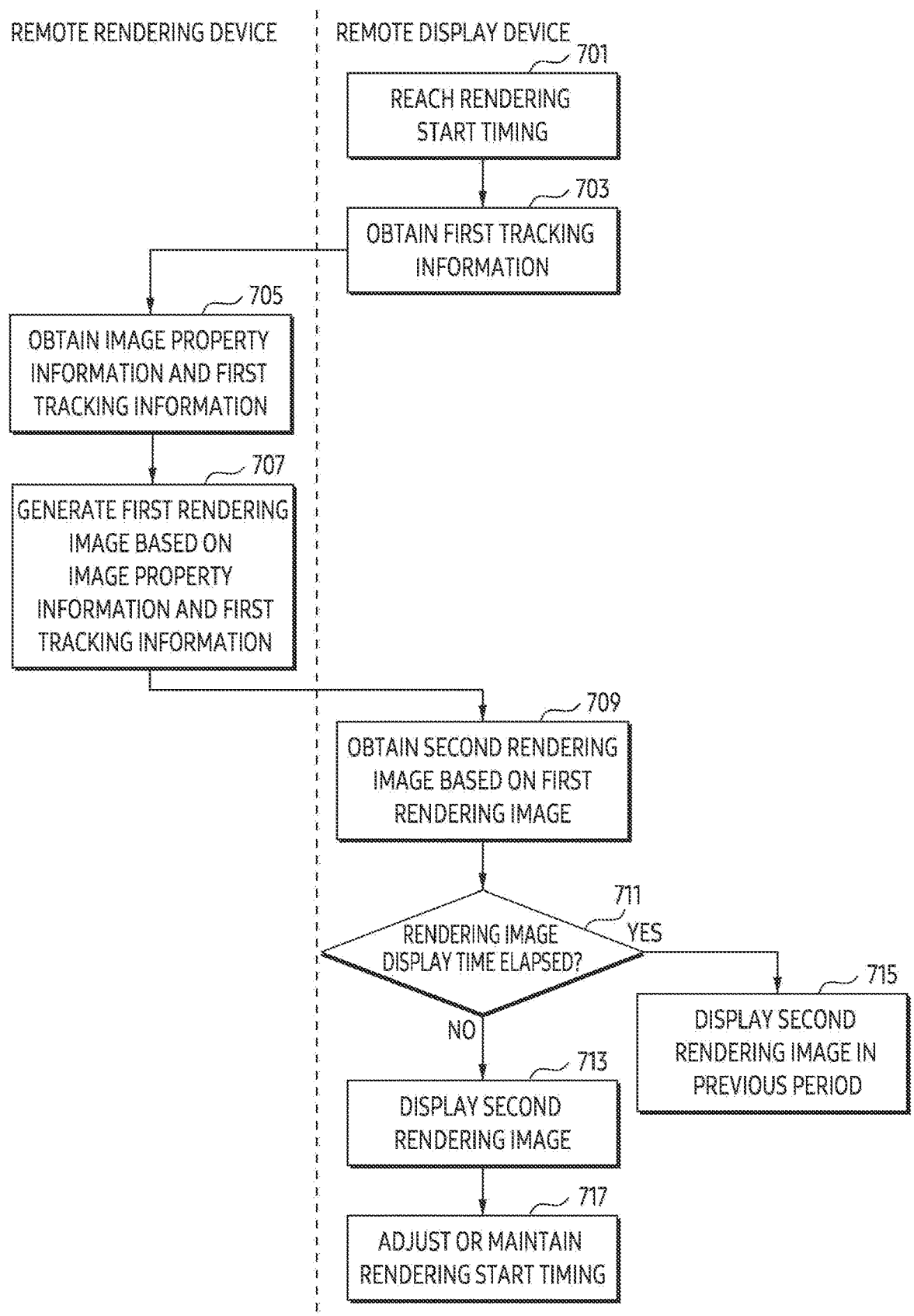
FIG. 7 illustrates a flow of an operation of an electronic device for displaying a rendering image according to one or more embodiments.

FIG. 7 illustrates a flow of an operation of an electronic device for displaying a rendering image according to one or more embodiments.

Referring to FIG. 7, in operation 701, a rendering start timing may be reached. A remote display device (e.g., the remote display device 503 of FIG. 5) may identify a rendering start timing. According to an embodiment, the remote display device 503 may identify the central processing unit (CPU) availability information of the remote display device 503 and the graphic processing unit (GPU) availability information of the remote display device 503. The remote display device 503 may receive the central processing unit (CPU) availability information of the remote rendering device (e.g., the remote rendering device 501 of FIG. 5) and the graphic processing unit (GPU) availability information of the remote rendering device 501. According to an embodiment, the rendering start timing may be identified based on the central processing unit (CPU) availability information of the remote rendering device 501, the graphic processing unit (GPU) availability information of the remote rendering device 501, the central processing unit (CPU) availability information of the remote display device 503, the graphic processing unit (GPU) availability information of the remote display device 503, a rendering processing time, and a network delay time. The rendering processing time may determine an acquisition timing of the first rendering image. The remote rendering device 501 may determine the acquisition timing of the first rendering image such that an interval between the acquisition timing of the first rendering image and the display timing of the second rendering image is less than a reference value.

In operation 703, the remote display device 503 may obtain first tracking information based on reaching the rendering start timing. The first tracking information may be information on a user's movement identified before the rendering start timing. For example, the first tracking information may be a user's head angle. For another example, the first tracking information may be a direction of a pupil. For the other example, the first tracking information may be a user's hand motion. The remote display device 503 may obtain first tracking information on a user's movement through a tracking sensor (e.g., the sensor module 176 of FIG. 1). For example, the tracking sensor 176 may be a camera (e.g., the first camera unit 211 of FIG. 2) for head tracking. For example, the tracking sensor 176 may be a camera (e.g., the second camera unit 213 of FIG. 2) for gaze tracking (or eye tracking). For example, the tracking sensor 176 may be an inertial sensor for tracking a user's head angle. The remote display device 503 may transmit a message including image property information and the first tracking information to the remote rendering device 501 through a communication circuit (e.g., the communication module 190 of FIG. 1). However, when the layer is a non-tracking layer, the remote display device 503 may not identify the first tracking information. In addition, the remote display device 503 may transmit a message including image property information excluding the first tracking information to the remote rendering device 501 through the communication circuit 190. The image property information may include information on whether an object included in an image is rendered based on tracking information or not. The image property information may include information on whether an object included in an image is rendered independently of tracking information or not. The image property information may include a priority between objects in an image.

In operation 705, the remote rendering device 501 may receive image property information and the first tracking information through the communication circuit 190. The image property information may include whether the image is an image having a non-tracking property or an image having a tracking property. However, when rendering a second image having a non-tracking property, the remote rendering device 501 may receive a message including image property information excluding the first tracking information through the communication circuit 190.

In operation 707, the remote rendering device 501 may generate a first rendering image by referring to the first tracking information. The first rendering image may be generated based on the image property information, the first tracking information, and data for rendering. The data for rendering may be received from an application through the communication circuit 190. For example, the data for rendering may be received from an application for virtual reality (VR). For another example, the data for rendering may be received from an application for augmented reality (AR). The remote rendering device 501 may transmit the first rendering image to the remote display device 503 through the communication circuit 190.

In operation 709, the remote display device 503 may obtain a second rendering image based on the first rendering image. The remote display device 503 may obtain the second rendering image by correcting the first rendering image based on second tracking information. This is to reduce an error of the second rendering image by reducing a time interval between a tracking information identification timing and a display timing of the second rendering image. When the error of the second rendering image is reduced, a user may feel less dizziness caused by a mismatch between the motion and the field of view compared to a case where the error of the second rendering image is large.

In operation 711, the remote display device 503 may identify whether a rendering image display time has elapsed or not. In case that the rendering image display time has elapsed, the remote display device 503 may perform operation 715. In case that the rendering image display time has not elapsed, the remote display device 503 may perform operation 713. The remote display device 503 may display an image according to a certain period. For example, when the display displays a screen at about 60 hertz (Hz), the remote display device 503 may display an image about once every ¹⁄₆₀ seconds. For another example, when the display displays the screen at about 120 hertz (Hz), the remote display device 503 may display an image about once every ¹⁄₁₂₀ seconds.

In operation 713, the remote display device 503 may display a second rendering image. When the second rendering image is obtained before the rendering image display time elapses, the remote display device 503 may display the second rendering image.

In operation 715, the remote display device 503 may display the second rendering image of a previous period. After the rendering image display time has elapsed, the remote display device 503, which will obtain the second rendering image cannot display the obtained second rendering image, so it may display the second rendering image of the previous period. The second rendering image obtained after the rendering image display time has elapsed may be stored as a buffer image in a next period. The buffer image may be an image displayed when the second rendering image is not generated before the rendering image display time. However, embodiments of the disclosure are not limited thereto. According to an embodiment, the second rendering image obtained after the rendering image display time has elapsed may be deleted to secure a storage space.

In operation 717, the remote display device 503 may adjust or maintain the rendering start timing. The remote display device 503 may adjust or maintain the rendering start timing through feedback. The feedback may be a process of adjusting the rendering start timing after the rendering display timing such that a time interval between the acquisition timing of the first rendering image and the display timing of the second rendering image is less than or equal to a reference value. The remote display device 503 may identify a time interval between the acquisition timing of the first rendering image and the display timing of the second rendering image. When the time interval is greater than or equal to the reference value, the rendering start timing after the rendering display timing may be delayed compared to the rendering start timing after the rendering display timing of the previous period. In other words, when the time interval in the first period is greater than or equal to the reference value, the remote display device 503 may set the interval between the display timing of the second rendering image in the first period and the rendering start timing in the second period to be longer than the interval between the display timing of the second rendering image in a previous period of the first period and the rendering start timing in the first period. This is to reduce the interval between the second tracking information identification timing and the display timing of the second rendering image by reducing the time interval between the acquisition timing of the first rendering image and the display timing of the second rendering image. When the time interval between the timing of identifying the tracking information and the timing of displaying the second rendering image decreases, an error of the second rendering image may be reduced compared to a case where the time interval is large. When the error of the second rendering image is reduced, a user may feel less dizziness caused by a mismatch between the motion and the field of view compared to a case where the error of the second rendering image is large.

Figure 8:
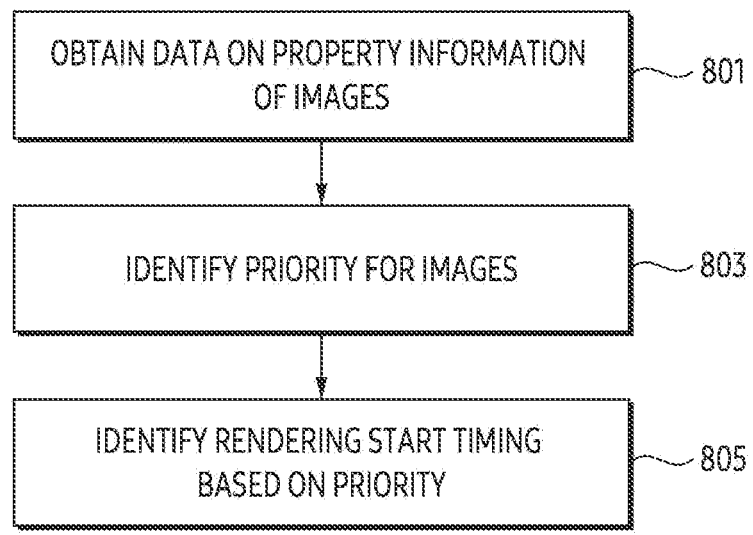
FIG. 8 illustrates a flow of an operation of an electronic device for identifying a rendering start timing according to one or more embodiments.

FIG. 8 illustrates a flow of an operation of an electronic device for identifying a rendering start timing according to one or more embodiments.

Referring to FIG. 8, in operation 801, a remote display device (e.g., a remote display device 603 of FIG. 6) may obtain property information of images. Image property information may include information on whether it is a tracking property or a non-tracking property according to whether tracking information is required when rendering. The first image having the tracking property may include data using the tracking information when rendering. The second image having the non-tracking property may include data not using the tracking information when rendering. The first image having the tracking property may be classified according to a distance from virtual objects included in the first image to a user. For example, the first image having the tracking property may be classified into a tracking layer in which the distance from the virtual objects included in the first image to a user is less than a specified value, and a tracking layer in which the distance from the virtual objects included in the first image to a user is greater than or equal to the specified value.

In operation 803, the remote display device 603 may identify a priority for images. The priority of an object in the second image having the non-tracking property may be higher than the priority of an object in the first image having the tracking property. This is to reduce the interval between the tracking timing and the rendering image display timing by rendering the object in the first image later than the object in the second image. This is because when the interval between the tracking timing and the rendering image display timing is reduced, a user may feel less dizziness caused by a mismatch between the motion and the field of view compared to a case where the error of the second rendering image is large. In the second image having the non-tracking property, the priority of an image including an object of a relatively large area may be higher than the priority of an image including an object of a relatively small area. This is because when rendering the second image having the non-tracking property, the rendering image may be stably secured as the rendering start timing is faster. This is because the image including an object of a relatively large area has high user attention, so a rendering image needs to be stably secured. With respect to the virtual objects in the first image, the priority of the virtual object whose distance to a user is less than a reference distance may be higher than the priority of a background object whose distance to the user is greater than or equal to the reference distance. In a case of the background object whose distance between the virtual object and the user is greater than or equal to the reference distance, since the virtual object is less affected by tracking information, the priority may be set low.

In operation 805, the remote display device 603 may identify a rendering start timing based on the priority. According to an embodiment, the rendering start timing may be different according to an object in an image for requesting a rendering. For example, the rendering start timing of the first image using tracking information for rendering may be later than the rendering start timing of the second image not using tracking information for rendering. For example, in virtual reality (VR), the rendering start timing of the first image for indicating the background may be later than the rendering start timing of the second image for indicating a system window. This is to make a time for identifying the tracking information as close as possible to the display timing of the second rendering image by delaying the rendering of the first image. When a time interval between the timing of identifying the tracking information and the timing of displaying the second rendering image decreases, the error of the second rendering image may be reduced compared to a case where the time interval is large. When the error of the second rendering image is reduced, a user may feel less dizziness caused by a mismatch between the motion and the field of view compared to a case where the error of the second rendering image is large.

According to an embodiment, the rendering start timing may be identified based on a priority corresponding to a layer. According to an embodiment, in the first image having the tracking property, the rendering start timing may be later as the priority is lower. In the second image having the non-tracking property, the rendering start timing may be earlier as the priority is higher. For example, the remote rendering device (e.g., the remote rendering device 601 of FIG. 6) may identify a first rendering start timing based on the first object in the first image. The remote rendering device 601 may identify a second rendering start timing based on the second object in the first image. The first priority corresponding to the first object may be higher than the second priority corresponding to the second object. The second rendering start timing may be earlier than the first rendering start timing. The first image having tracking property may be rendered based on tracking information identified later as a priority of a layer is higher compared to a case in which a priority of a layer is lower. This is because the error of the rendering image is reduced as it is rendered based on the identified tracking information later. The priority may be determined according to an object in an image. For example, the priority may be higher for an object closer to a user on the virtual image. For example, the remote display device 603 may identify a third rendering start timing based on a third object in the second image having the non-tracking property. The remote rendering device 601 may identify a fourth rendering start timing based on a fourth object in the second image having the non-tracking property. A third priority corresponding to the third object may be higher than a fourth priority corresponding to the fourth object. The third rendering start timing may be earlier than the fourth rendering start timing. The object in the second image having the non-tracking property may have an earlier rendering start timing compared to a case where the priority of the layer is low, as the priority is higher. This is because the second image is rendered without using tracking information. Since a rendering image may be stably secured as the rendering start timing is earlier, the rendering start timing may be earlier as the priority is higher. The priority may be determined according to the layer.

Figure 9:
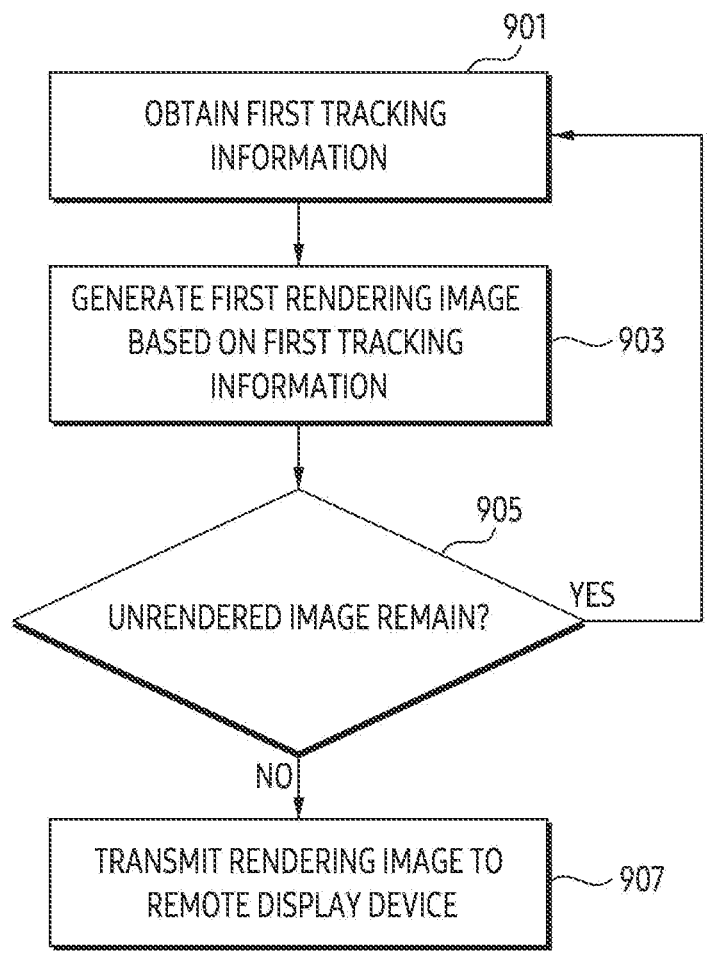
FIG. 9 illustrates a flow of an operation of an electronic device for generating a rendering image according to one or more embodiments.

FIG. 9 illustrates a flow of an operation of an electronic device for generating a rendering image according to one or more embodiments.

Referring to FIG. 9, in operation 901, a remote rendering device (e.g., a remote rendering device 501 of FIG. 5) may obtain the first tracking information. The remote rendering device 501 may receive image property information and first tracking information from a remote display device 503 through a communication circuit (e.g., the communication module 190 of FIG. 1). The image property information may include information on whether an object included in the first image is rendered based on tracking information or not. However, when the layer is a non-tracking layer, the remote rendering device 501 may receive image property information excluding first tracking information through the communication circuit 190.

In operation 903, the remote rendering device 501 may generate a first rendering image based on the first tracking information. The first rendering image may include the image property information, the first tracking information, and data for rendering. The data for rendering may be received from an application through the communication circuit 190. For example, the data for rendering may be received from an application for virtual reality (VR). For another example, the data for rendering may be received from an application for augmented reality (AR). The remote rendering device 501 may transmit the first rendering image to the remote display device 503 through the communication circuit 190.

In operation 905, the remote rendering device 501 may identify whether an unrendered object (image) remains. In case that the unrendered object (image) remains, the remote rendering device 501 may perform operation 901. In case that the unrendered object (image) does not remain, the remote rendering device 501 may perform operation 907.

In operation 907, the remote rendering device 501 may transmit a rendering image to the remote display device 503. The remote rendering device 501 may generate a first rendering image. The remote rendering device 501 may transmit the generated first rendering image to the remote display device 503.

As described above, according to an embodiment, an electronic device (e.g., one of electronic device 102, remote display device 503, and remote display device 603) may comprise at least one processor, a tracking sensor (e.g., at least one of sensor module 176, first camera unit 211, and second camera unit 213), a communication circuit, and a display. The at least one processor may obtain first tracking information for a movement of a user through the tracking sensor (e.g., at least one of sensor module 176, first camera unit 211, and second camera unit 213). The at least one processor may receive, from an external electronic device (e.g., one of electronic device 101, remote rendering device 501, and remote rendering device 601) through the communication circuit 190, image property information to request a rendering. The at least one processor may identify a tracking property of a first image based on the image property information. The at least one processor may determine a rendering start timing for the first image having the tracking property based on a rendering processing time. The at least one processor may transmit, to the external electronic device 101, 501, and 601 through the communication circuit 190, a message including the image property information of the first image and the first tracking information, based on the rendering start timing for the first image. The at least one processor may receive, from the external electronic device 101, 501, and 601 through the communication circuit 190, a first rendering image rendered based on the image property information of the first image and the first tracking information. The at least one processor may display, through the display, a second rendering image generated based on the first rendering image. The image property information of the first image may comprise information on whether an object included in the first image is rendered based on tracking information.

According to an embodiment, to determine the rendering start timing for the first image, the at least one processor may identify a first rendering start timing based on a first object included in the first image having the tracking property. To determine the rendering start timing, the at least one processor may identify a second rendering start timing based on a second object included in the first image having the tracking property. A first priority corresponding to the first object may be higher than a second priority corresponding to the second object. The second rendering start timing may be earlier than the first rendering start timing.

According to an embodiment, the at least one processor may identify a non-tracking property of a second image based on second image property information. The at least one processor may determine a rendering start timing for the second image having the non-tracking property. The at least one processor may further transmit, to the external electronic device through the communication circuit 190, a message including the second image property information of the second image, based on the rendering start timing for the second image. To determine the rendering start timing for the second image, the at least one processor may identify a third rendering start timing based on a third object included in the second image having the non-tracking property. The at least one processor may identify a fourth rendering start timing based on a fourth object included in the second image having the non-tracking property. A third priority corresponding to the third object may be higher than a fourth priority corresponding to the fourth object. The third rendering start timing may be earlier than the fourth rendering start timing.

According to an embodiment, a rendering start timing for the first image may be identified based on a network delay time between the electronic device and the external electronic device, central processing unit (CPU) availability information of the electronic device, graphic processing unit (GPU) availability information of the electronic device, CPU availability information of the external electronic device, GPU availability information of the external electronic device, and a display timing of the second rendering image.

According to an embodiment, an acquisition timing of the first rending image may be determined such that an interval between the acquisition timing of the first rendering image and a display timing of the second rendering image is less than a reference value. The acquisition timing of the first rending image may be determined based on the rendering processing time.

According to an embodiment, to determine the rendering start timing for the first image, the at least one processor may identify the CPU availability information of the electronic device and the GPU availability information of the electronic device. To determine the rendering start timing, the at least one processor may receive the CPU availability information of the external electronic device and the GPU availability information of the external electronic device through the communication circuit 190.

According to an embodiment, in a first period, the at least one processor may further identify a time interval between an acquisition timing of the first rendering image and the display timing of the second rendering image. To determine the rendering start timing, the at least one processor may, based on the time interval in the first period being greater than or equal to a reference value, set, in the first period and a second period next to the first period, an interval between a display timing of the second rendering image in the first period and a rending start timing in the second period to be longer than the time interval 511 between a display timing of the second rendering image in a previous period of the first period and a rending start timing in the first period.

According to an embodiment, the rendering start timing for the first image in the second period may be identified based on the network delay time between the electronic device and the external electronic device in the second period. The network delay time in the second period may be identified based on the network delay time in the first period, an amount of data to be rendered in the first period, and an amount of data to be rendered in the second period.

As described above, according to an embodiment, a method performed by an electronic device (e.g., one of electronic device 102, remote display device 503, and remote display device 603) may comprise obtaining first tracking information for a movement of a user through a tracking sensor of the electronic device (e.g., at least one of sensor module 176, first camera unit 211, and second camera unit 213). The method may comprise receiving, from an external electronic device (e.g., one of electronic device 101, remote rendering device 501, and remote rendering device 601) through a communication circuit (e.g., communication module 190), image property information to request a rendering. The method may comprise identifying a tracking property of a first image based on the image property information. The method may comprise determining a rendering start timing for the first image having the tracking property based on a rendering processing time. The method may comprise transmitting, to the external electronic device through the communication circuit 190, a message including the image property information of the first image and the first tracking information, based on the rendering start timing for the first image. The method may comprise receiving, from the external electronic device through the communication circuit 190, a first rendering image rendered based on the image property information of the first image and the first tracking information. The method may comprise displaying, through a display of the electronic device, a second rendering image generated based on the first rendering image. The image property information of the first image may comprise information on whether an object included in the first image is rendered based on tracking information or not.

According to an embodiment, the determining of the rendering start timing may comprise identifying a first rendering start timing based on a first object included in the first image having the tracking property. The determining of the rendering start timing may comprise identifying a second rendering start timing based on a second object included in the first image having the tracking property. A first priority corresponding to the first object may be higher than a second priority corresponding to the second object. The second rendering start timing may be earlier than the first rendering start timing.

According to an embodiment, the method may further comprise identifying a non-tracking property of a second image based on second image property information. The method may further comprise determining a rendering start timing for the second image having the non-tracking property. The method may further comprise transmitting, to the external electronic device through the communication circuit 190, a message including the second image property information of the second image, based on the rendering start timing for the second image. The determining of the rendering start timing for the second image may comprise identifying a third rendering start timing based on a third object included in the second image having the non-tracking property. The determining of the rendering start timing for the second image may comprise identifying a fourth rendering start timing based on a fourth object included in the second image having the non-tracking property. A third priority corresponding to the third object may be higher than a fourth priority corresponding to the fourth object. The third rendering start timing may be earlier than the fourth rendering start timing.

According to an embodiment, the rendering start timing for the first image may be identified based on a network delay time between the electronic device and the external electronic device, central processing unit (CPU) availability information of the electronic device, graphic processing unit (GPU) availability information of the electronic device, CPU availability information of the external electronic device, GPU availability information of the external electronic device, and a display timing of the second rendering image.

According to an embodiment, the determining of the rendering start timing may comprise identifying the CPU availability information of the electronic device and the GPU availability information of the electronic device. The determining of the rendering start timing may comprise receiving the CPU availability information of the external electronic device and the GPU availability information of the external electronic device through the communication circuit 190.

According to an embodiment, in a first period, the method may further comprise identifying a time interval 519 between an acquisition timing of the first rendering image and a display timing of the second rendering image. The determining of the rendering start timing may comprise, based on the time interval in the first period being greater than or equal to a reference value, setting, in the first period and a second period next to the first period, an interval between a first display timing of a second rendering image in the first period and a rending start timing in the second period to be longer than the time interval 511 between a second display timing of a second rendering image in a previous period of the first period and a rending start timing in the first period.

According to an embodiment, the rendering start timing for the first image in the second period may be identified based on a network delay time between the electronic device and the external electronic device in the second period. The network delay time in the second period may be identified based on the network delay time in a first period, an amount of data to be rendered in the first period, and an amount of data to be rendered in the second period.

As described above, according to an embodiment, an electronic device (e.g., one of electronic device 101, remote rendering device 501, and remote rendering device 601) may comprise at least one processor and a communication circuit. The at least one processor may identify first image property information of a first image rendered based on tracking information as a tracking property. The at least one processor may identify second image property information of a second image rendered independently of the tracking information as a non-tracking property. The at least one processor may transmit the first image property information to an external electronic device (e.g., one of electronic device 102, remote display device 201, remote display device 503, and remote display device 603) through the communication circuit. The at least one processor may receive, through the communication circuit, the first image property information of the first image and the first tracking information, based on a rendering start timing. The at least one processor may generate a first rendering image by rendering based on the first image property information of the received first image and the first tracking information.

The at least one processor may transmit, the rendered first rendering image to an external electronic device through the communication circuit.

According to an embodiment, to generate the first rendering image, the at least one processor may perform a rendering for a first object in a first rendering start timing based on the first object included in a first image having the tracking property. To generate the first rendering image, the at least one processor may perform a rendering for a second object in a second rendering start timing based on the second object included in the first image having the tracking property. A first priority corresponding to the first object may be higher than a second priority corresponding to the second object. The second rendering start timing may be earlier than the first rendering start timing.

According to an embodiment, to generate the first rendering image, the at least one processor may perform a rendering for a third object in a third rendering start timing based on the third object included in a second image having the non-tracking property. To generate the first rendering image, the at least one processor may perform a rendering for a fourth object in a fourth rendering start timing based on the fourth object included in the second image having the non-tracking property. A third priority corresponding to the third object may be higher than a fourth priority corresponding to the fourth object. The third rendering start timing may be earlier than the fourth rendering start timing.

According to an embodiment, to receive the first image property information of the first image and the first tracking information based on the rendering start timing through the communication circuit, the at least one processor may identify central processing unit (CPU) availability information of the electronic device and graphic processing unit (GPU) availability information of the electronic device. To receive the first image property information of the first image and the first tracking information based on the rendering start timing through the communication circuit, the at least one processor may transmit, to the external electronic device through the communication circuit, the CPU availability information of the electronic device and the GPU availability information of the electronic device.

According to an embodiment, to receive the first image property information of the first image and the first tracking information based on the rendering start timing through the communication circuit, the at least one processor may identify a rendering processing time, which is an amount of time taken to render the first rendering image. The at least one processor may transmit the rendering processing time to the external electronic device.

According to an embodiment, at least one of the first object or the second object comprises a tracking object. The tracking object indicates an area corresponding to a game screen. A position of the tracking object changes based on a change in at least one of a user's head angle or a direction in which a user's pupil moves.

According to an embodiment, at least one of the third object or the fourth object comprises a non-tracking object. The non-tracking object is displayed at a specific position on a screen independently of a user's head angle or a user's hand motion. The non-tracking object comprises a guide window explaining a game setting.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device comprising:
   memory storing instructions;
   at least one processor;
   a tracking sensor;
   a communication circuit; and
   a display,
   wherein the instructions, when executed by the at least one processor, cause the electronic device to:
   identify that a first image is to be rendered in accordance with, among a tracking property for indicating a rendering using tracking information and a non-tracking property for indicating a rendering independent of tracking information, the tracking property,
   determine a rendering start timing of the first image to be rendered in accordance with the tracking property, based on a rendering processing time required to render the first image on an external electronic device,
   obtain, through the tracking sensor, first tracking information for a movement of a user,
   transmit, to the external electronic device through the communication circuit, a first request message for the first image including the first tracking information, based on the rendering start timing of the first image,
   receive, from the external electronic device through the communication circuit, image data of a first rendering image rendered based on the first tracking information,
   obtain, through the tracking sensor, second tracking information for a movement of the user after receiving the image data of the first rending image, and
   display, through the display, a second rendering image generated based on the image data of the first rendering image and the second tracking information.

2. The electronic device of claim 1,
wherein the instructions, when executed by the at least one processor to determine the rendering start timing of the first image, further cause the electronic device to:
identify a first rendering start timing based on a first object included in the first image, and
identify a second rendering start timing based on a second object included in the first image,
wherein a first priority corresponding to the first object is higher than a second priority corresponding to the second object, and
wherein the second rendering start timing is earlier than the first rendering start timing.

3. The electronic device of claim 1,
wherein the instructions, when executed by the at least one processor, further cause the electronic device to:
identify that a second image is to be rendered in accordance with the non-tracking property,
determine a rendering start timing of the second image to be rendered in accordance with the non-tracking property, and
transmit, to the external electronic device through the communication circuit, a second request message for the second image based on the rendering start timing of the second image, and
wherein the rendering start timing of the second image is earlier than the rendering start timing of the first image.

4. The electronic device of claim 3,
wherein the first request message further includes first image property information indicating that at least one object of the first image is to be rendered based on the tracking property, and
wherein the second request message further includes second image property information indicating that at least one object of the second image is to be rendered based on the non-tracking property.

5. The electronic device of claim 1, wherein the rendering start timing of the first image is determined based on the rendering processing time required to render the first image on the external electronic device and a display timing of the second rendering image.

6. The electronic device of claim 1,
wherein an acquisition timing of the image data of the first rendering image is determined such that an interval between the acquisition timing of the image data of the first rendering image and a display timing of the second rendering image is less than a reference value, and
wherein the acquisition timing of the image data of the first rendering image depends on the rendering processing time.

7. The electronic device of claim 1,
wherein the rendering start timing of the first image is determined based on at least one of central processing unit (CPU) availability information of the electronic device, graphic processing unit (GPU) availability information of the electronic device, CPU availability information of the external electronic device, or GPU availability information of the external electronic device, and
wherein, to determine the rendering start timing of the first image, the at least one processor is further configured to:
identify the CPU availability information of the electronic device and the GPU availability information of the electronic device, and
receive the CPU availability information of the external electronic device and the GPU availability information of the external electronic device through the communication circuit.

8. The electronic device of claim 1,
wherein the rendering start timing of first image is determined based on a network delay time between the electronic device and the external electronic device in a second period next to a first period, and
wherein the network delay time in the second period is determined based on a network delay time between the electronic device and the external electronic device in the first period, an amount of data to be rendered in the first period, and an amount of data to be rendered in the second period.

9. A method performed by an electronic device, the method comprising:
identifying that a first image is to be rendered in accordance with, among a tracking property for indicating a rendering using tracking information and a non-tracking property for indicating a rendering independent of tracking information, the tracking property;
determining a rendering start timing of the first image based on a rendering processing time required to render the first image on an external electronic device;
obtaining, through the tracking sensor, first tracking information for a movement of a user;
transmitting, to the external electronic device through the communication circuit, a first request message for the first image including the first tracking information, based on the rendering start timing of the first image;
receiving, from the external electronic device through the communication circuit, image data of a first rendering image rendered based on the first tracking information;
obtaining, through the tracking sensor, second tracking information for a movement of the user after receiving the image data of the first rending image; and
displaying, through a display of the electronic device, a second rendering image generated based on the first rendering image and the second tracking information.

10. The method of claim 9,
wherein the determining of the rendering start timing of the first image comprises:
identifying a first rendering start timing based on a first object included in the first image; and
identifying a second rendering start timing based on a second object included in the first image,
wherein a first priority corresponding to the first object is higher than a second priority corresponding to the second object, and
wherein the second rendering start timing is earlier than the first rendering start timing.

11. The method of claim 10, further comprising:
identifying that a second image is to be rendered in accordance with the non-tracking property;
determining a rendering start timing of the second image to be rendered in accordance with the non-tracking property; and
transmitting, to the external electronic device through the communication circuit, a second request message for the second image based on the rendering start timing of the second image,
wherein the rendering start timing of the second image is earlier than the rendering start timing of the first image.

12. The method of claim 11,
wherein the first request message further includes first image property information indicating that at least one object of the first image is to be rendered based on the tracking property, and
wherein the second request message further includes second image property information indicating that at least one object of the second image is to be rendered based on the non-tracking property.

13. The method of claim 9, wherein the rendering start timing of the first image is determined based on the rendering processing time required to render the first image on the external electronic device and a display timing of the second rendering image.

14. The method of claim 9,
wherein the rendering start timing of the first image is determined based on at least one of central processing unit (CPU) availability information of the electronic device, graphic processing unit (GPU) availability information of the electronic device, CPU availability information of the external electronic device, or GPU availability information of the external electronic device, and
wherein the determining of the rendering start timing of the first image comprises:
identifying the CPU availability information of the electronic device and the GPU availability information of the electronic device; and
receiving the CPU availability information of the external electronic device and the GPU availability information of the external electronic device through the communication circuit.

15. The method of claim 9,
wherein the rendering start timing of the first image is determined based on a network delay time between the electronic device and the external electronic device in a second period next to a first period, and
wherein the network delay time in the second period is determined based on a network delay time between the electronic device and the external electronic device in the first period, an amount of data to be rendered in the first period, and an amount of data to be rendered in the second period.

16. An electronic device comprising:
memory storing instructions;
at least one processor; and
a communication circuit,
wherein the instructions, when executed by the at least one processor, cause the electronic device to:
receive, from an external electronic device through the communication circuit, a first request message for a first image to be rendered in accordance with, among a tracking property for indicating a rendering using tracking information and a non-tracking property for indicating a rendering independent of tracking information, the tracking property, the first message including first tracking information for a movement of a user,
generate a first rendering image by rendering based on the first tracking information, and
transmit, to the external electronic device through the communication circuit, image data of the first rendering image,
wherein the image data of the first rendering image is used to display a second rendering image at the external electronic device, and
wherein the first request message is transmitted from the external electronic device based on a rendering start timing of the first image.

17. The electronic device of claim 16,
wherein the instructions, when executed by the at least one processor to generate the first rendering image, further cause the electronic device to:
based on a first object included in the first image, perform a rendering for the first object in a first rendering start timing, and
based on a second object included in the first image, perform a rendering for the second object in a second rendering start timing,
wherein a first priority corresponding to the first object is higher than a second priority corresponding to the second object, and
wherein the second rendering start timing is earlier than the first rendering start timing.

18. The electronic device of claim 16,
wherein the instructions, when executed by the at least one processor, further cause the electronic device to:
receive a second request message for a second image to be rendered in accordance with the non-tracking property,
wherein the second request message is transmitted from the external electronic device based on a rendering start timing of the second image, and
wherein the rendering start timing of the second image is earlier than the rendering start timing of the first image.

19. The electronic device of claim 16,
wherein the instructions, when executed by the at least one processor, further cause the electronic device to:
identify central processing unit availability information of the electronic device and graphic processing unit (GPU) availability information of the electronic device, and
transmit, to the external electronic device through the communication circuit, the CPU availability information of the electronic device and the GPU availability information of the electronic device, and
wherein at least one of central processing unit (CPU) availability information of the electronic device, graphic processing unit (GPU) availability information of the electronic device. CPU availability information of the external electronic device, or GPU availability information of the external electronic device is used to determine the rendering start timing of the first image.

20. The electronic device of claim 16,
wherein the instructions, when executed by the at least one processor, further cause the electronic device to:
identify a rendering processing time, which is an amount of time to be taken to render the first rendering image, and
transmit the rendering processing time to the external electronic device, and
wherein the rendering processing time is used to determine the rendering start timing of the first image.

* * * * *